R. REA AND F. W. WATERS.
FRUIT, VEGETABLE, AND OTHER FOOD DEHYDRATING FURNACE AND ITS COÖPERATING APPARATUS.
APPLICATION FILED NOV. 29, 1918.
1,328,396.
Patented Jan. 20, 1920.
3 SHEETS—SHEET 3.
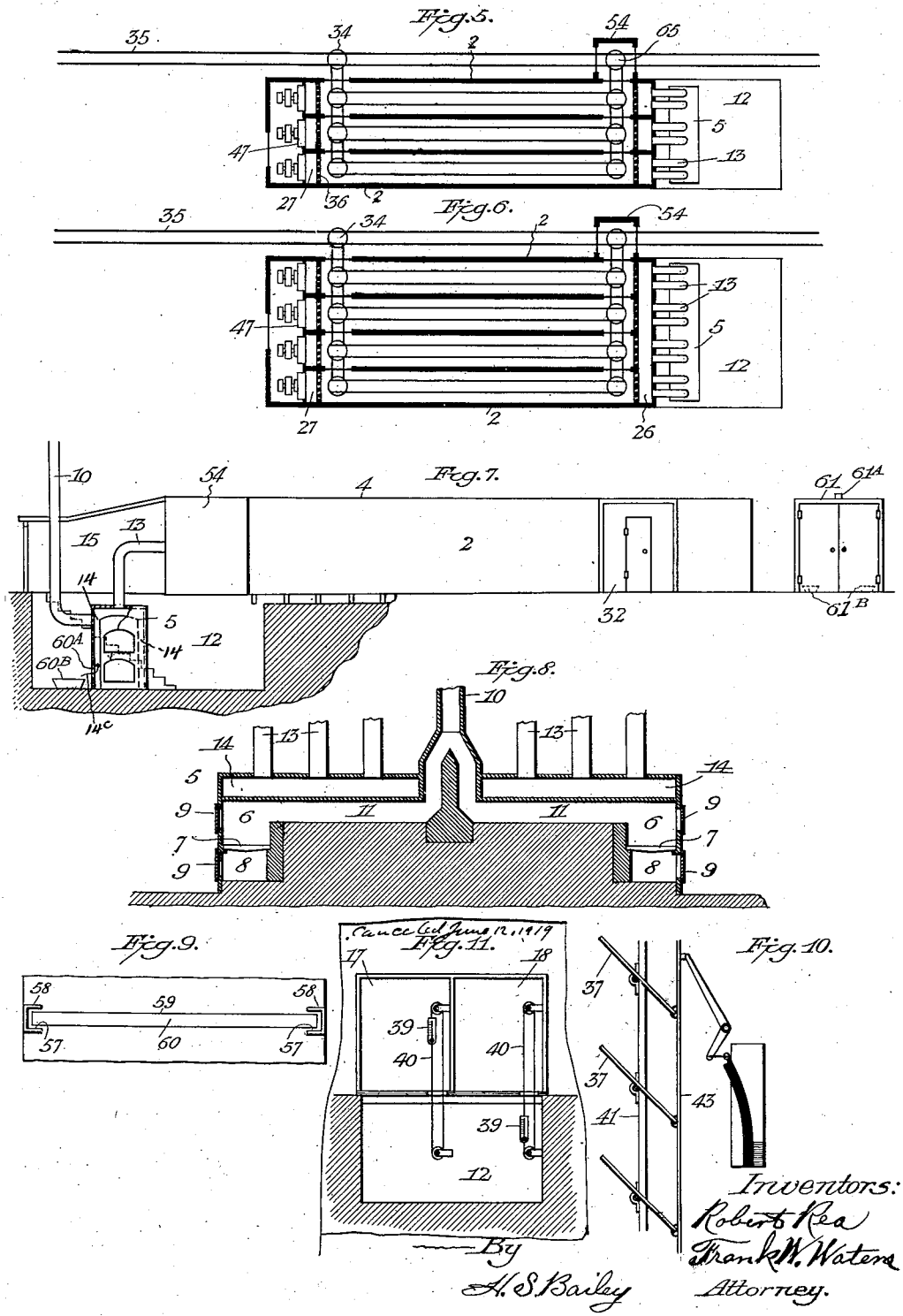

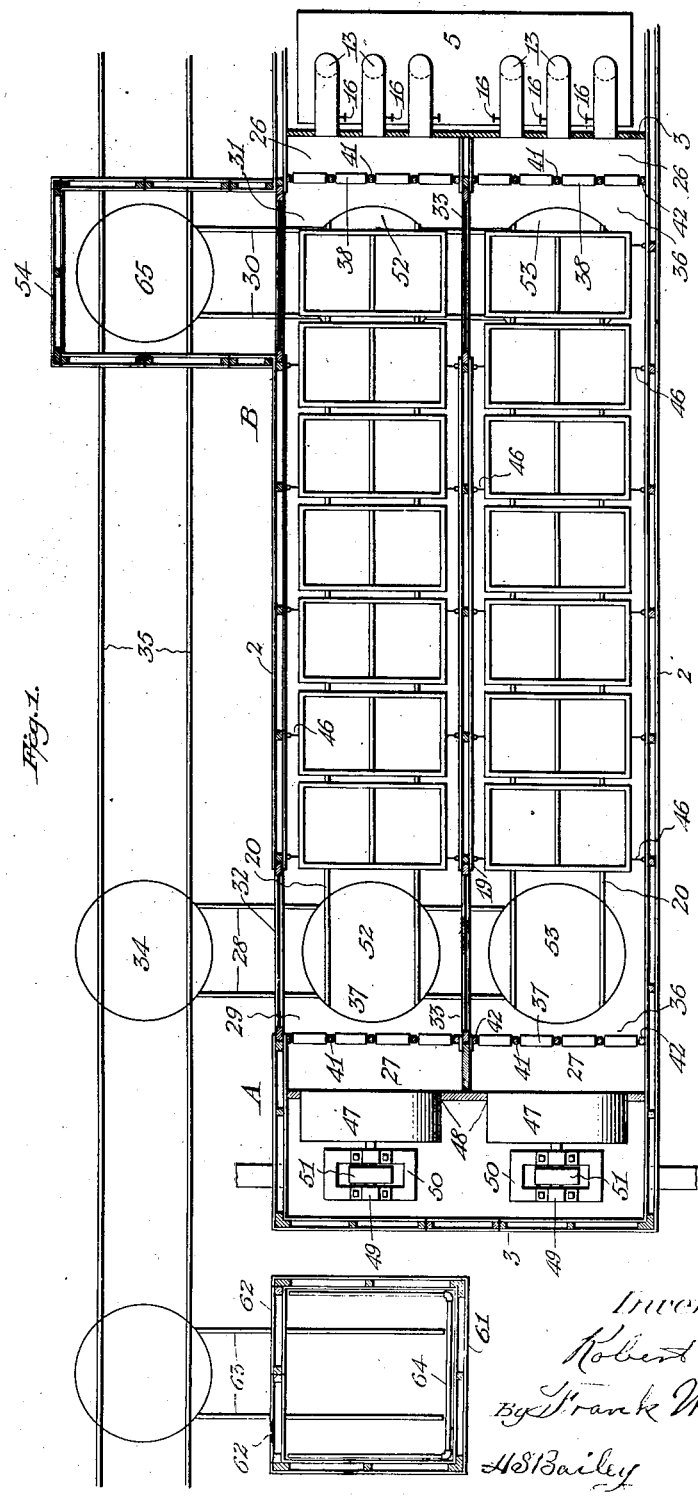

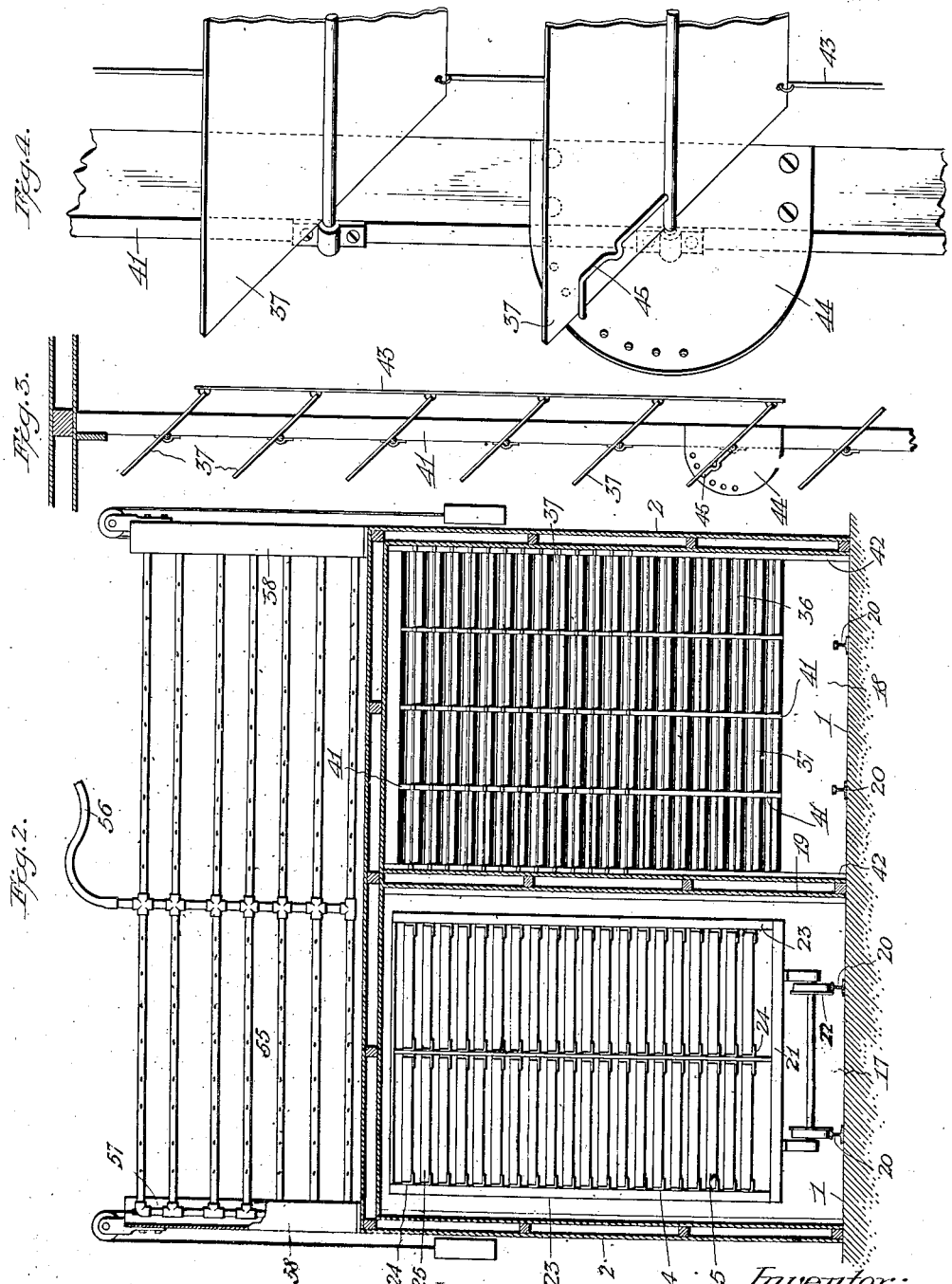

UNITED STATES PATENT OFFICE.

ROBERT REA AND FRANK W. WATERS, OF PORTLAND, OREGON.

FRUIT, VEGETABLE, AND OTHER FOOD DEHYDRATING FURNACE AND ITS COÖPERATING APPARATUS.

1,328,396.  Specification of Letters Patent.  Patented Jan. 20, 1920.

Application filed November 29, 1918. Serial No. 264,707.

*To all whom it may concern:*

Be it known that we, ROBERT REA and FRANK W. WATERS, citizens of the United States of America, residing at Portland, county of Multnomah, and State of Oregon, have invented new and useful Fruit, Vegetable, and other Food Dehydrating Furnaces and their Coöperating Apparatus, of which the following is a specification.

Our invention relates to a new and improved fruit, vegetable and other food dehydrating furnace and its coöperating apparatus, and the objects of our invention are:

First, to provide a fruit and vegetable dehydrating heat drying furnace that is adapted to receive and progressively dehydrate a plurality of car loads of fruits, vegetables and other foods.

Second, to provide a dehydrating drier in which a structural drier is provided that is adapted to dehydrate a plurality of vertically stacked car loaded trays full of sliced fruits or vegetables, and in which the drier has one or a plurality of railway car receiving and drying chambers, said drier being provided with a car entrance and exit, and that is adapted to give to said sliced product loaded trays a progressive heat increasing treatment from the time of the entrance of each car to its exit from said chambers.

Third, to provide means for providing a fruit and vegetable dehydrating drier of large tonnage capacity, in which car loads of trays of sliced product are dehydrated at a time, to provide a plurality of drying chambers in said drier, and to provide heating medium producing, controlling and regulating means, and to provide suitable bleaching treatments at predetermined times in said drier of said sliced fruit and vegetable products.

Fourth, to provide a simple, inexpensive, easily constructed sliced fruit and vegetable drier that can be operated at small expense, is of large capacity and is thoroughly practical and efficient and dries fruits, vegetables and other food products quickly and evenly.

We attain these objects by the mechanism illustrated in the accompanying drawings, in which:

Figure 1 is a horizontal sectional view showing the arrangement of the improved drying or dehydrating apparatus, twin drying chambers being shown.

Fig. 2 is a transverse vertical sectional view of Fig. 1, a tray holding truck being shown in one of the chambers, the other chamber being shown empty to afford an unobstructed view of the heating medium regulating shutters at the end thereof, a vertically movable group of perforated steam pipes being shown mounted on the top of the chambers for introducing steam to said chambers.

Fig. 3 is a detail vertical sectional view showing a group of the heating medium regulating shutters, which are located at opposite ends of the driers, and means for defining the inclination of said shutters.

Fig. 4 is a detail perspective view—full size—more clearly illustrating the locking means for defining the inclination of the groups of shutters. This Fig. 4, and also Fig. 3, is illustrated in our companion application Serial No. 264709, filed Nov. 29, 1918; for a heat regulating adjustable shutter mechanism for fruit, vegetables and other food dehydrating plants.

Figs. 5 and 6 are diagrammatic plan views illustrating respectively a three-chamber and a four-chamber drier.

Fig. 7 is a side view, partly in section, showing the drier and its heating furnace.

Fig. 8 is a longitudinal sectional view through the furnace.

Fig. 9 is a plan view of a fragment of the furnace, showing the normally closed opening through which the vertically movable steam pipes are introduced into the chambers.

Fig. 10 is a detail sectional view showing a thermostat for operating the heating medium controlling shutters.

Similar letters of reference refer to similar parts throughout the several views.

Referring to the drawings:

The figures represent a fruit and vegetable dehydrating furnace drier embodying our invention.

In these figures the numeral 1 designates the floor of the drier.

Our fruit and vegetable dehydrating furnace drier can be built on any suitable foundation in the dehydrating plant. We preferably construct it on the floor of the dehydrating plant.

Our improved fruit and vegetable dehydrating furnace drier preferably consists of a long box-shaped structure, although if desired, it may be built of any other shape, and it may be constructed of concrete, brick or any other heat retaining material.

In the drawings accompanying this application, we have illustrated three arrangements of our dehydrating drier, a two-chambered, a three-chambered and a four-chambered fruit and vegetable dehydrating drier. We illustrate fragmentary plan veiws of the three and four-chambered drier. We prefer, however, to confine our description of the drier to the two drying tunnel shaped chambers unit of our dehydrating drier, as we now have a two-tunnel shaped chambered drier in our dehydrating plant at Fort Collins. But while we are now using a two-chambered drier unit in our plant, a three or four drying chambered dehydrating apparatus would probably be more economical in the use of fuel, and of larger dehydrating capacity for a drying chamber structure of the same length.

The two drying chamber furnace we are now using is constructed of concrete laid on wire lathing, that is secured to the opposite sides of wooden studdings.

The side walls 2, and the center partition wall, which is positioned halfway between the outside walls 2, and the end walls 3, and the roof 4, are of this construction. At the end of the structure a heated air producing furnace 5, is built, preferably below the floor of the dehydrating plant and below the main body of the drier. The walls of this furnace are preferably of brick. We preferably construct two fire boxes 6, in the furnace, one at each end, each of which consists of grate bars 7, an ash pit 8, and the entrance doors 9. A chimney 10, and flue 11, connects with the fire places. The advantage of two fire boxes is that it enables each drying chamber to have a heating unit by itself, independent of the other drying chambers in the drier. This arrangement individualizes each drying chamber and enables two different products requiring different periods of time—say one requiring about five or six hours and another requiring about ten or eleven hours—to be dried in the two chambers at the same time, as the volume and degree of heated air flowing into each can be regulated independently of the other, as will be fully explained hereinafter.

We preferably place the heated air producing furnace in a basement 12, below the level of the floor of the drier. Heated air conveying pipes 13, are connected to the heated air flue 14, of the furnace, and project from the heated air flue of the furnace through the roof of the furnace into a chamber 15, formed over the furnace, from which they project through a wall 3, of this chamber into a heated air regulating room formed at this furnace end of the drier. Each one of the heated air conveying pipes is provided with a damper 16, that can be manipulated by the fireman to regulate the flow of hot air into and through them. The two drying chambers 17, and 18, are formed, one on each side of a central partition 19, and between it and the side walls of the drier. Each of these drying chambers is made wide enough to receive cars loaded with fruits or vegetables, and a track 20, is laid on the floor of each chamber on which the cars run. These tracks incline or slope downward from the car entrance end of the drier toward the furnace and exit end of the drier. These cars are loaded with trays containing sliced fruits and vegetables. Each of these cars comprises a truck frame 21, to which track fitting car wheels 22, are rotatably mounted. To the four corners of the truck frame, standards 23, preferably of metal, are secured and project vertically upward and are suitably braced to form a square open vertically projecting frame. To the inside surfaces of the two opposite sides of this frame, in line with the car wheels, vertical rows of shelves 24, are constructed in opposite pairs, which are adapted to receive and support suitably constructed sliced product holding and drying trays 25 horizontally between the standards. These trays consist of a supporting frame 25, provided with a wire screen bottom. These wire screen bottoms are not illustrated as they are in common use in fruit and vegetable plants. We preferably make our cars high enough to hold about twenty-four trays. The height of the cars and the number of trays on each is limited to the height of the drier, which we preferably make high enough for a man to walk through, although it can be made higher than that if it is desirable to place more than twenty-four product holding trays on each car. The cars are made to fit close to the floor, sides and roof of the chambers in the drier, and at the same time to run on the inclined tracks through them. The trays are positioned at equal distances apart in their vertical arrangement on the cars, and this distance is sufficient to permit a current of hot air to flow freely over the top of, and also along the bottom of each tray on the car, as well as through the wire screen bottom of each tray, both above and below the trays, as will be fully described hereinafter.

The heated air from the furnace flows first through the pipes 13, into an end room 26, which we term the heated air regulating room. A similar heated air regulating room 27, is formed at the opposite, or fruit and vegetable entrance end portion of the drier. There is a track 28, and car passageway 29, that forms the car entrance end A, of the drier, and there is also a track 30, and car exit passageway 31, at the car discharging end of the drier. These tracks enter and leave the drier at right angles to the inclined tracks in the sliced product drying chambers.

The track 28, extends through a door 32, formed in the side wall of the drier, and there is also preferably a door 33, across these car passageways at each end of the partition 19, that separates the two drying chambers from each other, that enables the heated air to be confined wholly to either chamber. The track 28, leads laterally from a turn-table 34, placed in the main track 35, into and across the passageway 29, and the track 30, leads away from the passageway 31, and the drier to the dried fruit and vegetable storage and packing department of the dehydrating plant.

The heated air from the furnace flows freely into the heated air regulating room 26, that is adjacent to the furnace, and the degree of the heated air and its volume that flows into the two open ends of the two drying chambers has to be regulated or tempered to the degree of heated air required, so that the drying process may be done evenly, progressively, and without injury to the product. There are a number of ways in which this particular feature of our dehydrating furnace may be carried out, but inasmuch as the heated air has to flow in an even volume throughout the width and height of the chambers from the heated air regulating room, we preferably carry out this feature of our invention in the following manner:

Across the heated air regulating room and the adjacent track and car passageways 29, and 31, of the opposite ends of the drying chambers of the dehydrating plant, we construct a shutter partition 36. This shutter partition comprising in each heated air regulating room a group of vertically arranged shutters 37 and 38, which extend across each room from the floor to the ceiling of the drier, so that all of the heated air that flows from the heated air conveying pipes of the furnace must flow through these shutters before it can enter the drying chambers at the furnace end of the drier, and also this hot air must flow from the opposite ends of the drying chambers through the shutter partition 36, before it can leave them and be drawn out of them.

Each of these shutter partitions consists of vertical metal studs 41, and the two outside end studs 42, are secured to the walls of the drier. This shutter partition is preferably divided into four vertical rows of shutters 37, and each vertical row of shutters is connected together into a group of six shutters each; each individual shutter comprises a thin strip of metal that is pivoted by a pin to the vertical studs 42, and each six shutters are connected together by a rod 43; so that the six can be swung on their pivotal centers up or down to open them the distance of their centers apart, so that the hot air can flow freely between them, or move them down so that they are close enough together to prevent any hot air from flowing between them. This arrangement permits the groups of shutters of each vertical row of shutters to be set at different predetermined angles of their full open positions. We find in practice that it is desirable to secure each set of shutters in their adjusted positions, and while there are a number of ways in which this feature of our invention can be carried out, we preferably employ a segment 44, of a circle that is secured to a stud 41, at one side of each set of shutters, and that is provided with a row of holes arranged in an arc of a circle, and a wire 45, is secured at one end to the shutter rod and is arranged to fit into any hole of the segment. Consequently, having set a shutter group in the desired open position, it is locked there by inserting the free end of the wire into the nearest hole in the segment. If desired, one or more of the groups of shutters may be automatically opened and closed by thermostats operatively connected to them, as shown in Fig. 10.

In order to prevent a current of heated air from hugging and traveling along the walls of the drier through the drying chambers of the furnace, we place a series of fenders 46, that project from the inside walls far enough to cause the hot air to flow away from the walls into alinement with the sides of the stack of fruit or vegetable loaded trays on the cars passing through the drying chambers. A set of these shutters is also placed across the heating medium regulating room 27, at the opposite end of the drier. The end A, of the drier is the loaded car entrance end, and the shutters at this end are manipulated to hold the hot air in the chambers at the degree of heat desired to dehydrate the fruits or vegetables under treatment. At this entrance end of the dehydrating drier, the extreme end of the drier is formed into two separated end square or rectangular compartments 27, that project from the vertical end studs 41, of the shutter partition, that are against the side walls 2, of the drier. The ends of these separated end portions of the drier are made to receive a suction fan 47, which is connected through an opening 48, into each end of each compartment of the drier. The fans are supported in boxes 49, that are secured in base blocks or pedestals 50, and they are driven by pulleys 51, on which is a power transmission belt which we do not illustrate.

At the junction of all of the car inlet and outlet tracks with the drying chamber tracks 20, turn-tables 52 and 53, or other suitable car switches, are installed that enable the cars to be switched from the entrance passageway into either chamber and from either chamber onto the discharging or outlet track, 30, from which they are run out of the dehydrating drier through a dry air auxiliary treatment chamber 54, to the dried product packing department.

Adjacent to the loaded car entrance end of the drier and close to the entrance ends of the drying chamber, we place a vertically moving frame of perforated pipe 55, that is arranged to be connected to a supply of steam by a piece of hose 56.

This steam distributing frame of piping normally stands above the roof 4, of the drier and is supported in slideways 57, formed in standards 58, that project above the roof of the drier, and the pipe frame slides down the standards into the drier through a slot 59, in its roof, which can be closed by a cover 60, when the pipe frame is not in use. The pipe frame is supported in its slideways 57, by weighted ropes that run over pulleys suitably arranged to counterbalance the weight of the pipe frame, so that an attendant within the drier can lower the pipe frame until its bottom rests on or close to the floor of the drier.

This steam discharging pipe frame is used as a bleaching element, as the steam discharging from it flows between and above and below each tray on the cars of trays in the drying chambers, and it comes in contact with both sides of each piece of sliced fruit or vegetable on each tray and saturates them with the steam and acts to make them porous and to, in a measure, loosen up their cell structure and to bleach them so that they, when dried, will be bleached and will retain their natural color. After an attendant has used the steam in this pipe frame, he raises it up through the roof and out of the way of cars of sliced product being moved into the drier to be dried. Some fruits do not need this steam treatment at this point in the drier.

Adjacent to the sliced product loaded car entrance end of the drier a separate and independent steam bleaching cabinet 61, is built and provided with a door 62, and with car tracks 63, and with a steam coil perforated piping frame 64 arranged and adapted to thoroughly apply steam treatment above and underneath and on all sides of the wire screen trays and the sliced product which is loaded on the cars and is pushed into this steam treatment cabinet and is given a steam bleaching treatment just prior to and before being moved into the loaded car entrance passageway 29, of the dehydrating drier.

We also provide at the dried product car exit end B, of the drier, a laterally projecting housing 54, that is provided with doors and a turn-table 65, into which the cars of dried product are run after they have passed through the drying chambers of the drier. This housing permits, when the doors are closed, of a dry air auxiliary heated air drying treatment when such auxiliary treatment is necessary. This auxiliary heated air treatment chamber is valuable to eliminate external moisture condensation if present.

All cars of dried product are run into this auxiliary heated air treatment chamber, although they do not all require this auxiliary heated air treatment, but some products throw off a good deal of moisture in drying and when steam is used there is a condensation that is apt to leave some moisture in the hot air. Consequently, this auxiliary heated air treatment is necessary under some conditions. When it is not necessary the cars are pushed from the drier into and through this auxiliary chamber and directly to the shipping department of the dehydrating plant.

The complete operation of our fruit and vegetable dehydrating furnace drier is as follows:

The fruits and vegetables to be dehydrated are first sorted to eliminate the bad and poor ones. The fruits are then pared by automatic paring machines which we do not illustrate, but which are operated by attendants, and are then conveyed by suitable conveyers to a fruit and vegetable slicing machine. The vegetables also after being sorted, are conveyed by suitable conveyers to the slicing machine.

The sliced product is conveyed from this slicing machine by a suitable conveyer, and is discharged from it onto the trays 25, that are manipulated by an attendant and are filled with the sliced product and are placed on a conveyer. We do not illustrate these several conveyers or the slicing machine, as they do not form a part of our present invention, but have briefly mentioned them, as they are used coöperatively with our drier in furnishing the sliced product to be dried in suitable condition to be dried and loaded on cars ready to be run into our drier and its coöperating apparatus that we have found in practice is essential to its successful operation on different fruits, vegetables and foods. This tray conveyer discharges its trays at its end to an attendant, who loads them on shelves of the cars. The loaded cars full of sliced product to be dried are then pushed to the drier, and with such sliced product as requires it, they are subjected to a steam bleaching treatment in the cabinet, to which any suitable bleaching chemical or chemical compound or other suitable bleaching element may be added and applied from a pan 61$^B$, containing sulfur, which may be placed in the cabinet 61. This cabinet is also provided with a vent pipe 61ᴬ, to allow the steam and sulfur vapors to escape from it.

The sliced product loaded cars are then, in case they are given this cabinet treatment, pushed from the cabinet into the entrance end 29, of the drier, which is adjacent to the hot air exhausting end of the drier close to the exhaust fans.

The cars are then switched on the turn-tables into the drying chambers 17 and 18, and each is moved from time to time toward the furnace end of the drier, which is its hottest end, and the heated air increases gradually in the chambers from the entrance end of the furnace or exit end of the furnace from which the cars are switched from the chambers on the turn-tables 53, into the auxiliary dry air treatment chamber 54, where, if desired, the heated air drying treatment may be continued, and at the end of this treatment, or if it is not required, the dry product is switched from the drier and moved to the packing department. In addition to the steam bleaching treatment in the cabinet 61, the trays of sliced product may be given an additional steam bleaching treatment at any time during their passage through the chambers from the steam distributing pipe-frame described on page 11. An additional sulfur treatment may be given in the drier the sulfur either being dissolved in the steam; or be drawn into the drier through the hot air flue, through a door 60ᴬ, from a pan 60ᴮ, containing sulfur. This door 60ᴬ, opens into the flue 14, the flue 14, being a space formed between the brick walls of the furnace and an outside casing that surrounds it, the flue 14, is illustrated in Fig. 8. This flue 14, is also shown in Fig. 7, by the arrow 14ᶜ, and it is defined in the furnace part of Fig. 7, between a fragmentary sectional part of the casing and the furnace.

The heated air, as it flows through the pipes 13, into the heated air regulating room 26, from the furnace 5, has to be controlled and regulated and tempered to suit the requirements of the sliced product in the drier, and we are not only able to control and regulate the degree and volume of heated air flowing over the sliced product into and through the trays, but are also able to subdivide the heat into as many flat currents of hot air as there are trays, and as the shutters are arranged to come opposite the shutters, the flat currents of air flow horizontally to and both above and below and between the shutters of all the trays on all of the cars in the chamber, and the side wall fender prevents the hot air from hugging the walls of the drier. In these shutter heated air regulating partitions, quick, even and thorough drying of all of the sliced product on the trays is accomplished, as at the entrance end A, of the drier the shutter partition 37, is used to shut off as much or as little of the heated air flowing from the furnace through the shutter partition 38, and the chambers from the suction fans which are constantly drawing the air through the drier from the furnace and chambers and these shutter partitions, and discharging it into the atmosphere, while this exit end shutter partition is manipulated to hold and confine or slow up the traveling speed of the hot air through the trays as conditions require, to get the best results on the product to be dried.

When the plant is running full capacity the chambers of the drier are kept full of cars loaded with sliced product holding trays, and then when the inner end car of each chamber is dried, all the cars are pushed forward far enough to move the dried product cars out of the chamber onto the turn-tables at the exit end of the drier, and a fresh car of loaded trays is run into the entrance end of each chamber. It requires about five or six hours to dry fruits, and as long or longer for vegetables, while for sweet corn, from about ten to eleven hours.

Our process provides a continuously and practically automatically operating fruit, vegetable and other food dehydrating plant that can be constructed at reasonable expense and that can be made of any desired capacity that fruit and vegetables can be obtained for, and it provides an economically operating and profitable enterprise that is a valuable feature in many vegetable and fruit growing districts, and while we have illustrated and described the preferred successive operative process steps and the coöperative and necessary operating apparatus, we do not wish to be limited to that described and illustrated, as many changes might be made without departing from the spirit of our invention.

Having described our dehydrating furnace drier and its coöperating apparatus, what we claim as new and desire to secure by Letters Patent, is:

1. A fruit and other food dehydrating drier, adapted to receive car load lots of product to be dried, said drier being provided with car inclosing means, and suitable car supporting entrance and exit tracks and switches, and downwardly inclined car forwarding tracks in said drier, means for heating said drier, means, including adjustable shutters, for regulating the heat in said drier, means including a bleaching apparatus in said drier arranged to apply a bleaching treatment to said car loads of fruit and vegetable products, means including suction fans, for exhausting the hot air as desired, from said drier, and means, including an auxiliary dry air heating chamber, arranged to give a dry air treatment to the car loads of products after being dehydrated in said drier.

2. A suitable food dehydrating furnace drier comprising a box shaped structure provided with a door closing car and track entrance passageway at one end, and a car and track exit passageway at its opposite end, drying chambers in said drier provided with downwardly inclined tracks extending through its drying chambers, from the car entrance end of said drier to its car discharging tracks, a furnace at the exit end of said drier, suction fans located at its opposite end, a regulating room at each end of said drier, a shutter partition separating said regulating rooms from said passageways, a slot through the roof of said drier, a counterbalanced frame slidably mounted above said drier, to be moved reciprocally down through said slot, a group of steam distributing perforated pipes in said frame, and a flexible connection between said frame and a supply of steam.

3. In a suitable food dehydrating drier, a box shaped structure provided with an entrance and an exit passageway adapted to receive car loads of product to be dried, and provided with one or more downwardly inclined car tracks extending from its entrance to its exit passageways, suitable track and switching means leading into and out of said drier to said inclined tracks, a car receiving chamber in said drier along each of said inclined tracks of a size to receive freely but fit closely said car loads of fruit and vegetable product, means for providing and introducing heat into said drier, and means including adjustable and independent groups of opening and closing shutters in said drier for regulating the flow of heat along said inclined track.

4. In a fruit and vegetable or other food dehydrating drier, a box shaped structure provided with an entrance and an exit passageway adapted to receive car loads of product to be dried, and provided with one or more downwardly inclined car tracks extending from its entrance to its exit passageways, suitable track and switching means leading into and out of said drier to said inclined tracks, means for providing and introducing heated air into said drier, means including adjustable and independent groups of opening and closing shutters in said drier for regulating the flow of heating medium along said inclined track, and means including steam distributing apparatus arranged at a predetermined point in said drier for imparting a bleaching treatment to said car loads of product to be dehydrated.

5. In a fruit and vegetable or other food dehydrating drier, a box shaped structure provided with an entrance and an exit passageway adapted to receive car loads of product to be dried, and provided with one or more downwardly inclined car tracks extending from its entrance to its exit passageways, suitable track and switching means leading into and out of said drier to said inclined tracks, means for providing and introducing heated air into said drier, means including adjustable and independent groups of opening and closing shutters in said drier for regulating the flow of heated air along said inclined track, and means including a reciprocal movement steam distributing apparatus arranged at a predetermined point in said drier, for imparting a bleaching treatment to said car loads of product to be dehydrated.

6. In a suitable food dehydrating drier, a box shaped structure provided with an entrance and an exit passageway adapted to receive car loads of product to be dried, and provided with one or more downwardly inclined car tracks extending from its entrance to its exit passageways, suitable track and switching means leading into and out of said drier to said inclined tracks, means for providing and introducing heat into said drier, means including adjustable and independent groups of opening and closing shutters in said drier for regulating the flow of heat along said inclined track, and means including steam distributing apparatus, said steam distributing apparatus comprising a counterbalanced sliding frame provided with a group of perforated pipes arranged to discharge steam into said cars of product to be bleached.

7. In a suitable food dehydrating drier, the combination with the box shaped structural drier, the car receiving chambers therein provided with inclined tracks and entrance and exit tracks and car switching members, means for heating said drier, vertical shutter partitions at the opposite ends of said drier, the adjustable and independent groups of shutters in said partitions, the curved segments provided with a curved row of apertures, and the pins on each group of shutters arranged to lock said shutters in set positions, with cars fitting said tracks and arranged to hold a plurality of trays of sliced fruits and vegetables or foods to be dried, arranged in horizontal planes on said cars, said trays projecting vertically above said cars and spaced at such predetermined distances apart as will allow hot air to circulate freely between them, said cars of trays being adapted to fit freely but closely in said chambers.

8. In a fruit and vegetable or other food dehydrating drier, the combination with the box shaped structural drier, the car receiving chambers therein provided with inclined tracks and its entrance and exit tracks and car switching members, means for heating said drier, vertical shutter partitions at the opposite ends of said drier, the adjustable and independent groups of shutters in said partitions, the curved segments provided with a curved row of apertures, and the pins on each group of shutters arranged to lock said shutters in set positions, with cars fitting said tracks and arranged to hold a plurality of trays of sliced fruit and vegetables to be dried, arranged in horizontal planes on said cars, said trays projecting vertically above said cars and spaced at such predetermined distances apart as will allow hot air to circulate freely between them, said cars of trays being adapted to fit freely but closely in said chambers, and means including perforated piping for introducing a bleaching vapor at predetermined times into said chambers.

9. In a fruit and vegetable or other food dehydrating drier, the combination with the box shaped structural drier, the car receiving chambers therein provided with inclined tracks and its entrance and exit tracks and car switching members, means for heating said drier, vertical shutter partitions at the opposite ends of said drier, the adjustable and independent groups of shutters in said partitions, the curved segments provided with a curved row of apertures, and the pins on each group of shutters arranged to lock said shutters in set positions, with cars fitting said tracks and arranged to hold a plurality of trays of sliced fruit and vegetables to be dried, arranged in horizontal planes on said cars, said trays projecting vertically above said cars and spaced at such predetermined distances apart as will allow hot air to circulate freely between them, said cars of trays being adapted to fit freely but closely in said chambers, means including perforated piping for introducing a bleaching vapor at predetermined times into said chambers, said perforated piping comprising a frame provided with a group of perforated pipes slidably supported in suitable supports mounted above the roof of said drier, means including ropes secured to said frame for reciprocally counterbalancing said frame above the roof of said drier, a slot through said roof in which said frame slides reciprocally down into the drier to its floor, means for closing said slot when said frame is above said roof, and a flexible connection between said pipe frame and a supply of steam, said perforated pipe frame being arranged to be drawn down into said drier at the entrance end of said chambers and to discharge steam between the trays on said cars.

In testimony whereof we affix our signatures in presence of two witnesses.

ROBERT REA.
FRANK W. WATERS.

Witnesses:
G. SARGENT ELLIOTT,
ELIZABETH SMITH.